United States Patent

[15] 3,660,750

Businelli

[45] May 2, 1972

[54] SELF-REGULATED DC TO DC CONVERTER

[72] Inventor: Pietro Businelli, Milan, Italy

[73] Assignee: GTE Automatic Electric Laboratories Incorporated, Northlake, Ill.

[22] Filed: Dec. 7, 1970

[21] Appl. No.: 95,675

[30] Foreign Application Priority Data

Mar. 25, 1970  Italy..........................................22408

[52] U.S. Cl..................................321/2, 321/18, 321/27 MS
[51] Int. Cl. ..........................................................H02m 3/28
[58] Field of Search ..............................321/2, 16, 18, 27 MS

[56] References Cited

UNITED STATES PATENTS

| | | | |
|---|---|---|---|
| 3,205,424 | 9/1965 | Bates | 321/27 MS |
| 3,031,629 | 4/1962 | Kadri | 331/113 A |
| 3,219,906 | 11/1965 | Keller et al. | 321/16 |
| 3,297,936 | 1/1967 | Ruch | 321/27 MS |
| 3,390,322 | 6/1968 | Rogers | 321/27 MS |

*Primary Examiner*—William M. Shoop, Jr.
*Attorney*—Cyril A. Krenzer and B. E. Franz

[57] ABSTRACT

A regulated power supply using square wave generator the pulse width of which is governed by an impedance controlled by the converter output. The impedance is impressed on the square wave generator through an insulating transformer with two separate secondary windings, one connected to the diode bridge output of an output voltage error detector and the other connected to the diode bridge output of an overcurrent and overvoltage protecting device; in this manner physical isolation is provided between the error detector, as well as the protecting device, and the square wave generator and thus between the output and input of the power supply. The square wave generator output operates on the control input of a separate power inverter which is also used to provide a regulated, but isolated, output for normally powering the square wave generator. Initially the square wave generator is powdered by a preregulator associated with the DC input to the converter. In addition to the conventional output pulses the square wave generator also furnishes quenching pulses to minimize the switching losses in the switching transistors of the power inverter.

9 Claims, 11 Drawing Figures

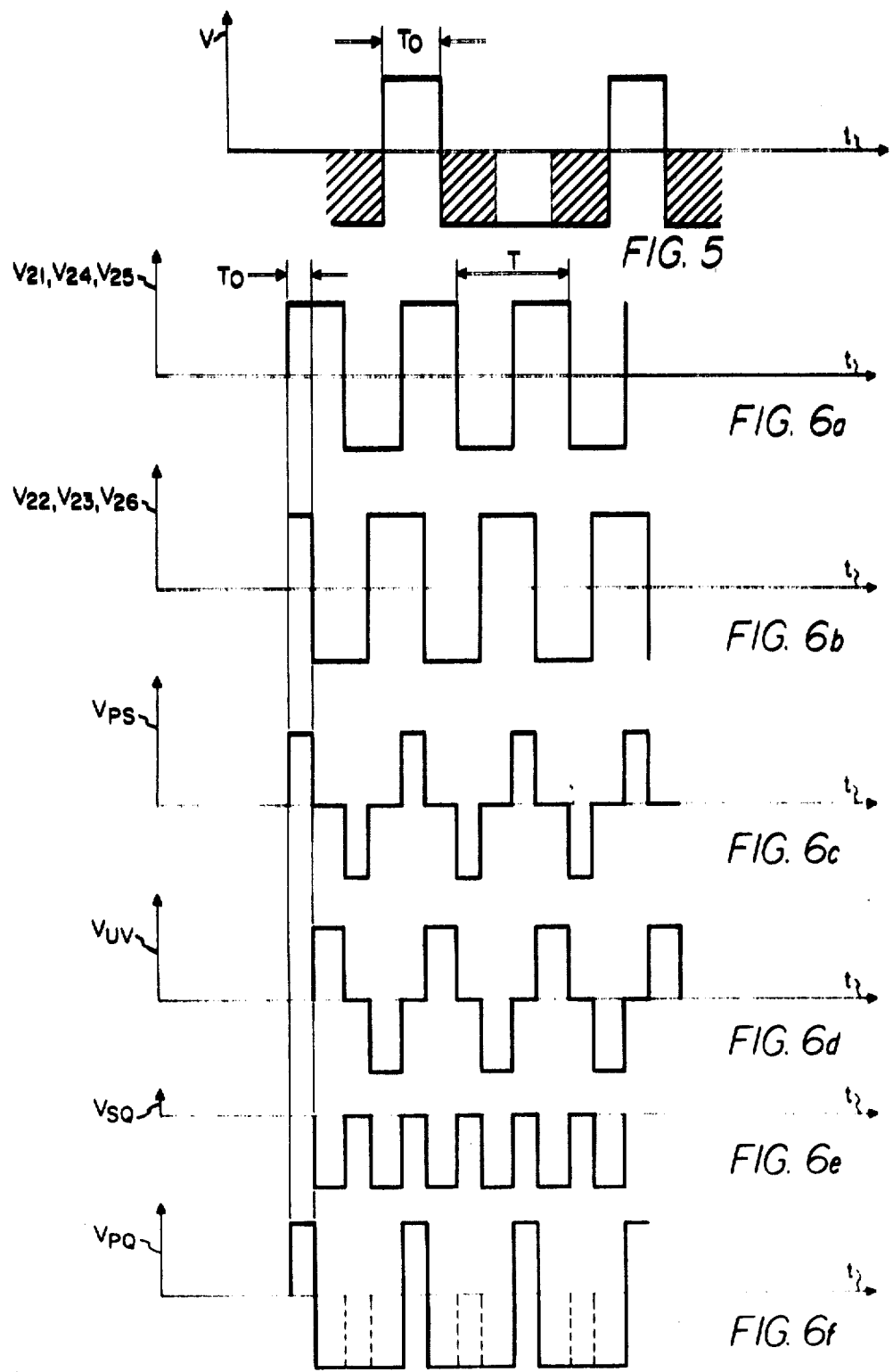

SELF-REGULATED DC TO DC CONVERTER

BACKGROUND OF THE INVENTION

1. Field of the Invention

This invention relates in general to power supply circuits connected to DC distribution systems, and more particularly to stabilized power supply devices. The principal purpose of these devices is to provide a substantially constant output voltage.

2. Description of the Prior Art

A conventional voltage regulator functions by way of a closed negative feedback loop. An error detector compares the output voltage across the load with a fixed reference voltage and feeds any discrepancy in these two voltages to a regulating device which is located between the input voltage source and the error detector. The regulating device is normally a variable impedance or a switch, electronic or otherwise, generally connected in series with the input voltage source. Regulators of this type fulfill their purpose reasonably well in that they stabilize the output voltage with respect to variations not only in input voltage but also in load.

Nevertheless these regulators are either rather complicated or their efficiency is not always satisfactory. As they are normally not able to provide galvanic isolation between the input source and the load, undesirable ground loops often result, with the danger of instability and shock hazard.

According to the present state of the art, self-regulated converters are of two types:

a. non-regulated converters preceded or followed by a voltage stabilizer.

b. converters with intrinsic regulation, generally operative to "chop," or vary the pulse width of the square wave present at the output transformer and subsequently rectify it in such a manner that an average DC voltage proportional to the "chopping" or pulse ratio is obtained. No description is given of converters of type (a) as they are not relevant to the present invention.

For converters of type (b), relevant to the invention described herein, certain embodiments are known, among which are the following:

1. U.S. Pat. No. 3,295,043 issued Dec. 27, 1966 to R.P. Massey. The self-regulated converter of the Massey patent operates according to the wave chopping principle by utilizing the rectangular hysteresis loop magnetization characteristic of the power transformer. This circuit provides the desired isolation between input and output circuits but it does not stabilize the output voltage against load variations.

2. U.S. Pat. No. 3,219,907 issued Nov. 23, 1965 to E. Josephson, and U.S. Pat. No. 3,219,906 issued on the same date to C. H. Keller et al. As in the case of (1) above, these patents make use of the characteristic of a rectangular hysteresis loop. However, they do not provide the desired isolation between input and output circuits.

3. U.S. Pat. No. 3,031,629 issued Apr. 24, 1962 to F.V. Kadri. This circuit also uses wave chopping and operates by controlling the phase displacement between two multivibrators (inverters). The resultant voltage of the two inverters, which is a chopped rectangular wave, is averaged and filtered according to the usual methods and fed to the load. The circuit regulates both for load variations and for variations of input voltage. However, the circuit shown in the Kadri patent does not provide isolation between output and input circuits. Further there is no protection against overloads. Since the phase regulation acts directly on the power stage there is a more than negligible loss of power in the master inverter due to the saturation of the iron, especially when the commutation frequency is of the order of tens of kilocycles, and the cost is also greater because the magnetic material used in self-saturated inverters is generally of the rectangular hysteresis loop type.

The object of the present invention is to provide a self-regulated DC to DC converter which presents none of the disadvantages of conventional converters of this type, but has all their advantages. More particularly the objects of the invention are:

1. to improve the efficiency of voltage regulation, even for variations of input voltage greater than 100 percent.
2. to provide the desired galvanic isolation between the input circuit and output circuit.
3. to obtain an output impedance lower than that normally obtained by the conventional arrangement in which a voltage stabilizer is followed by a non-regulated converter.
4. to provide a plurality of output voltages of any desired polarity and magnitude.
5. to provide protection against output overcurrent which is sufficiently rapid to protect the regulator semiconductors against overloads, regardless of which output voltage is involved.
6. to provide such protection in the form of a current limiter, that is, a circuit having an approximately constant current overload characteristic, with the result, among others, that the supply is automatically restored when the unstandard condition ceases to exist.
7. to insure for a given power and number of available voltages, and an equipment size and cost less than heretofore attained by conventional arrangements.

SUMMARY OF THE INVENTION

Briefly the regulated power supply described herein uses a square wave generator the pulse width of which is governed — as is known per se — by an impedance controlled by the converter output. However, according to the invention this impedance is impressed on the square wave generator through a transformer with at least two separate secondary windings, one connected to the diode bridge output of a converter output voltage error detector and another connected to the diode bridge output of an overcurrent and/or overvoltage protecting device. In this manner physical isolation is provided between the control means and the square wave generator and furthermore, a plurality of such control means — or regulator channels — may be provided for simultaneously acting on the pulse width varying circuitry of the square wave generator, without galvanic connection between the regulator channels themselves.

More particularly the self-regulated DC converter according to the embodiment of the invention described hereafter comprises, in its overall configuration, a chopped square wave generator having three inputs, of which a first is connected to the output of a starter device which stabilizes the DC feed voltage, a second connected through a transformer to the output of an error detector, and a third connected also through a transformer to the output of an overcurrent and overvoltage protection device. The output of the chopped square wave generator is connected to one input of a power inverter which has a second input connected through a low-pass filter to the DC feed source, and has two outputs, of which one is connected to the input of a rectifier and filter unit and the other to a second input of the protection device, a third input of the last-mentioned device being connected to a second output of the starter device.

With the arrangement described the DC to DC converter functions as a closed loop regulator on the output voltage, making the pulse ratio of the rectangular wave vary in such a manner as to maintain the output voltage constant, regardless of variations both of input voltage and load. Inasmuch as the loop is closed by means of transformer coupling, complete isolation of the output circuits with respect to the input circuit is achieved. The aforementioned transformer coupling in addition permits closure of a second regulator loop which becomes effective when the alternating current flowing through the power transistors exceeds a predetermined threshold value. In this manner the power transistors operate at constant current and are protected from both temporary and permanent overloads.

It is important to note that this protection, acting directly on the power transistors, safeguards the more sensitive components of the circuit and simultaneously controls all the outputs from the secondary inverter windings; as a result the protection mechanism intervenes irrespective of which output is affected by the overload or short circuit.

Another protective function assigned to this second regulator loop is that relating to load overvoltages. If as a consequence of a fault in the main voltage regulator, the output voltage should rise above a predetermined threshold value, the foregoing regulator loop would transform itself from a current limiter to a voltage limiter, safeguarding the loads connected to the outputs. Because of the absolute independence of the two regulator loops, which hereinafter will be called channels A and B, and which are separated galvanically by the presence of the transformer, it is reasonable to assume that this power supply is sufficiently safe for use with sensitive equipment such as used in modern telecommunications systems.

This closed loop output voltage regulator thus presents all the usual advantages of normal DC to DC converters, in that, because of the ON - OFF operation of the transistors, it operates with satisfactory efficiency and that it isolates the load from the input circuits. It can be used for stepping the voltage down or up.

BRIEF DESCRIPTION OF THE DRAWINGS

The invention will be better understood from the following description of one embodiment given by way of example with reference to the accompanying drawings, in which:

FIGS. 5 and 6 are further diagrams, which serve to explain the operation of the converter of FIG. 1.

As shown in FIG. 1, the self-regulated converter according to the invention comprises a controlled power inverter IP the input of which is connected to the output of filter FI fed at IN from a DC source and an output of which is connected to the input of a rectifier and filter unit RF having a number of outputs US. One of these outputs is connected to the input of an error detector and amplifier RE, to one of the inputs of an overcurrent and overvoltage protection device PS and to one of the inputs of a starter device DA, a second input of which is connected to a second output of the filter FI. A chopped square wave generator GOP has a first input connected to the output of the error detector and amplifier RE, a second input connected to the output of the protection device PS and a third input connected to the starter device DA. The output of the generator GOP is connected to a second input of the inverter IP which has a second output connected to a third input of the protection device PS.

Figure 2:
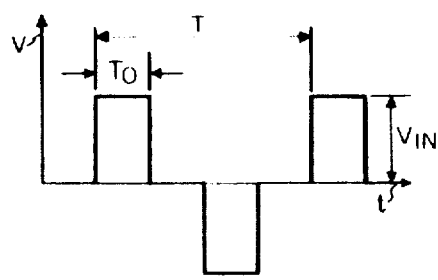
FIG. 2 represents the chopped square wave at the output of the power inverter.

The operation of the converter is as follows:

The DC input voltage is fed through the filter FI to the power converter IP which is of the push-pull type and it feeds a chopped square wave voltage of the form shown in FIG. 2 to the rectifier and output filter unit RF.

The amplitude of this voltage is proportional to the value of the battery voltage $V_{in}$, and is determined by the transformer ratio of the inverter output transformer. This alternating pulse wave of constant repetition frequency $F = 1/T$ is generated by the chopped wave generator GOP. The width of the pulses $t_o$ depends on the value of the input and output voltages, and, beyond a certain magnitude of input current, also on this latter.

The filter FI is in the form of a balanced low-pass LC filter and its function is to prevent the high frequency components generated in the supply source from being passed.

The purpose of the rectifiers and filters RF is to rectify the voltages from the secondary winding of the transformer of the inverter and to feed the resultant mean value to their respective outputs, as free as possible from high frequency disturbances.

The square wave generator GOP is a multivibrator similar to that shown by Kadri (U.S. Pat. No. 3,031,629) and its purpose is to generate the wave form, FIG. 2, necessary for the operation of the power inverter IP.

In this device the width of the pulses generated depends on the information which it receives from channels A and B, through the medium of a control circuit which will be detailed in the description which follows. During normal operation of the converter, the width of the pulses is given only by channel A which regulates the output voltage.

The error detector and amplifier RE (channel A) constitutes the main regulating unit. It compares the output voltage of the converter with a reference voltage, amplifies the difference signal and converts this signal into a resistance variation which controls the GOP. As will be noted from the description of the Kadri patent, the duration of the pulses generated by the GOP is a function of the resistance in the feedback loop of the multivibrator. The location of this resistance and the method of effecting the above-mentioned variation will be discussed later. Thus, in keeping with well-known closed loop regulation principles, a variation in the output voltage results in a change of the duration of the pulses which opposes the foregoing variation.

The overcurrent and overvoltage protection device PS (channel B) has the dual function of guarding the power transistors against excessive stresses, in case of short circuits or output overloads, and of guarding the loads against dangerous increases in output voltages, due to a breakdown or malfunction of the main regulator described in the preceding paragraph.

In this case the input current and output voltage are also compared with a reference level and they act on the width of the pulses of the GOP by means of a resistance variation, as in the case of the main regulator of the preceding paragraph.

The object of the starter device DA is to power the GOP and for correct operation this requires a constant voltage supply. During normal operation this condition is satisfied by using for the GOP the stabilized output voltage of the converter. During the starting phase, however, this voltage does not exist, or at least it has not yet attained its normal value, and consequently the DC input to the converter must be used as an energy source. Thus the object of the starter device is to take a portion of the input power and pass it under voltage stabilized conditions to the GOP. As soon as the converter is in a steady state condition, this power portion is derived from the output circuit.

"Current" channel B is fed continually by the starter device because the circuit must always be effective, especially when the output voltage drops or disappears because of an overload. Its consumption under normal operating conditions is so low as not to influence the overall efficiency of the system to an appreciable extent.

Figure 1:
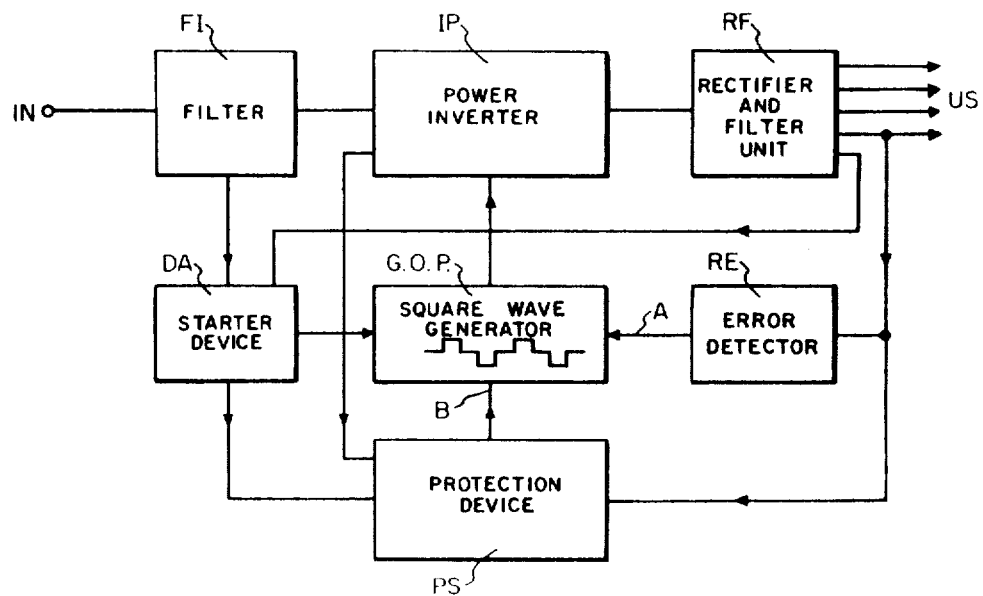
FIG. 1 is a block diagram of a self-regulated DC to DC converter according to the invention.

The individual circuits which comprise the self-regulated converter of FIG. 1 will now be described in detail with reference to FIGS. 3 and 4.

Figure 3:
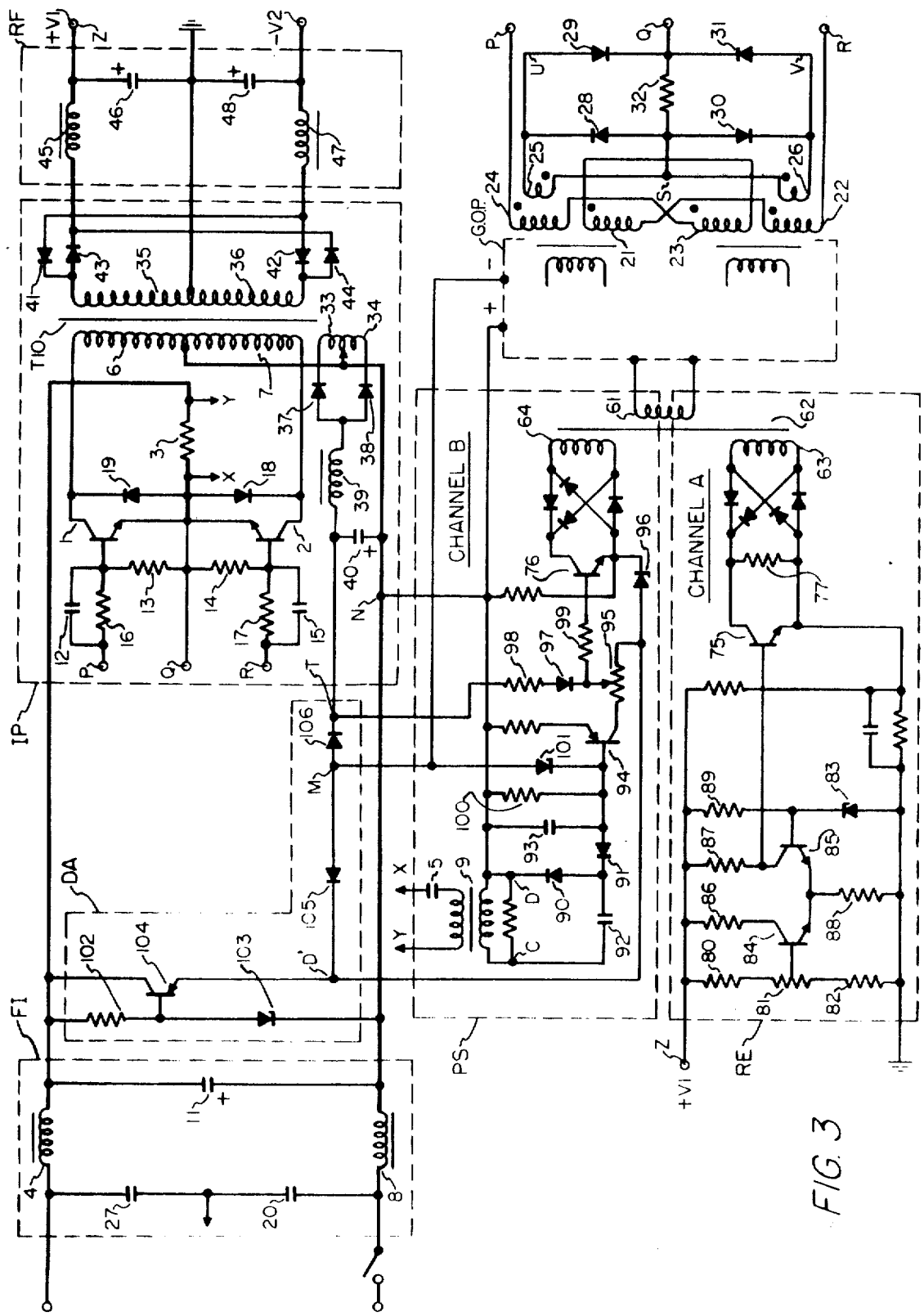
FIG. 3 is a partially schematic circuit diagram of the converter of FIG. 1.

The power inverter IP is of the push-pull common emitter type and utilizes a pair of transistors 1 and 2 as switches which are controlled by the pulses furnished by the chopped wave generator GOP and are present between the terminals P-Q and R-Q, as indicated in the top center portion and the lower right portion of FIG. 3. The common point of the emitters is connected to the negative input terminal of the converter by way of resistor 3 and filter inductance 4. Resistor 3 has a sensing function and it passes to the input of the overcurrent protection circuit PS unipolar voltage pulses which are proportional to the current pulses traversing transistors 1 and 2. The terminals x, y of 3 are connected to similar terminals x, y of the protection device PS (channel B) as indicated in the drawing. Capacitor 5 nullifies the effects of the continuous voltage component which is present across 3, thereby preventing continuous polarization of the core of transformer 9. The supply circuit for the inverter is completed by way of the collectors of transistors 1 and 2, the windings 6 and 7 of power transformer $T_{10}$ and the other filter inductance 8. Inductances 4 and 8 together with capacitors 11, 20 and 27 form a balanced filter the purpose of which is to attenuate the alternating current components received by the inverter, thereby substantially keeping these components from being passed down the line.

The control pulses of the power inverter IP reach the bases of the transistors 1 and 2 by way of speed up units which consist of resistors 16 and 17 and capacitors 12 and 15 connected in parallel to the two resistors, respectively. Resistors 13 and 14 provide shunt paths to the base-emitter circuits of transistors 1 and 2 during their OFF condition. Zener diodes 18 and 19 provide surge protection for transistors 1 and 2 during their switching intervals.

The control pulses from the GOP have the form shown in FIG. 5 and differ from those at the output of the inverter (FIG. 2) by the presence of quenching pulses (hatched areas) which are essential for the correct turn-off of the power transistors.

Figure 4:
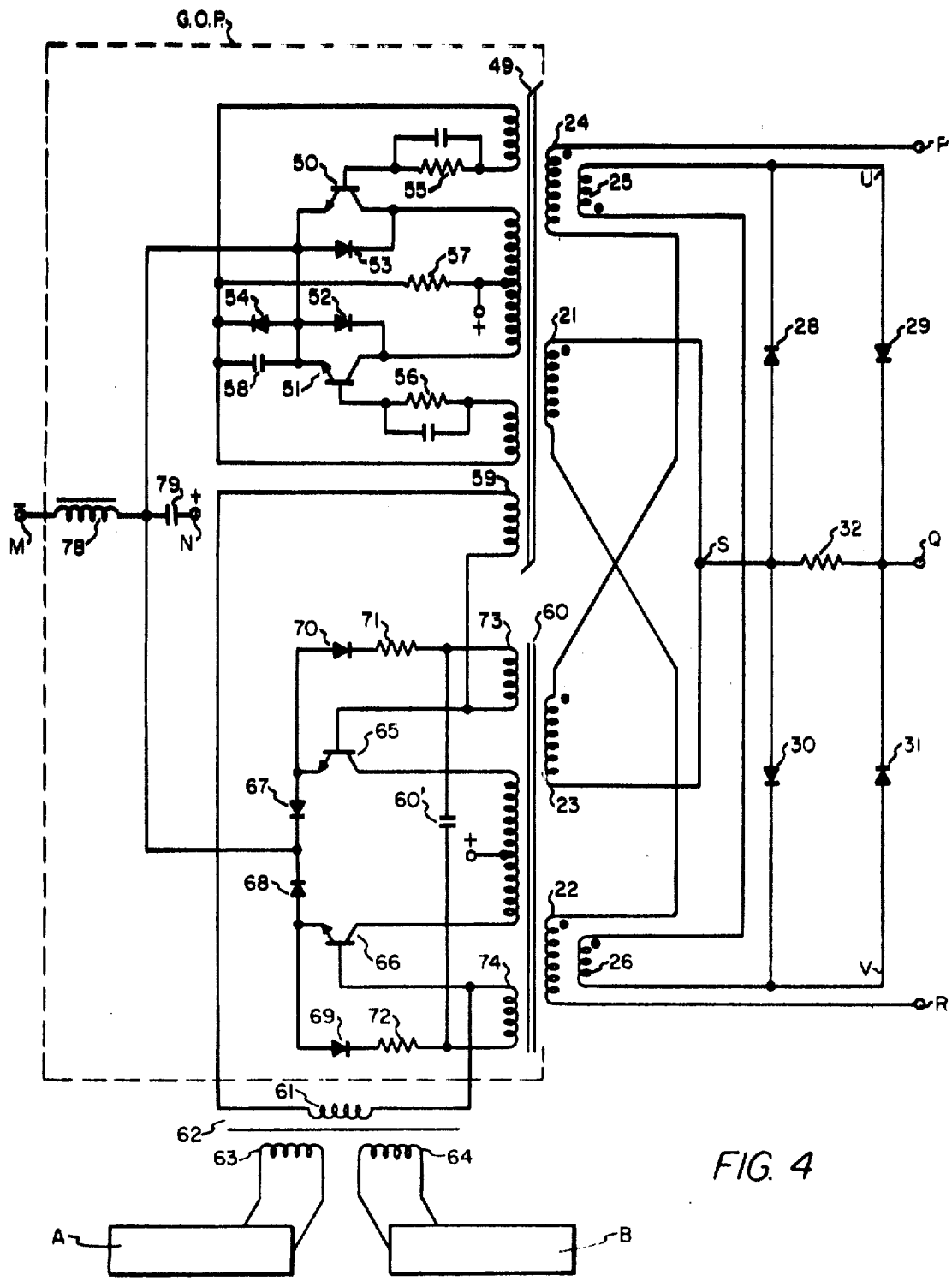
FIG. 4 is the detailed electrical diagram of the chopped wave generator shown in FIG. 3 in block form only, together with components which serve to produce quenching pulses.

These quenching pulses which are superimposed on the form of the original wave produced by the Kadri multivibrator, are generated in the following manner:

Referring to the diagram of the GOP, FIG. 4, the secondary windings 21 and 24 are associated with the master inverter and form across their ends a square wave voltage as shown in FIG. 6a.

The windings 22 and 23 which are associated with the slave inverter form across their ends a voltage which, because of the phase displacement action of the two inverters taken together, has the form shown in FIG. 6b. Considering the series connection of windings 23 and 24 and their polarity, the wave form of the resulting voltage between points P and S is shown in FIG. 6c. Similar reasoning applies to windings 21 and 22 as regards the voltage between points R and S, which is phase displaced by T/2 with respect to $V_{PS}$.

From the polarity of windings 25 and 26 it will be readily appreciated that the voltage between points U and V, provided by the connection of these two windings, will have the form shown in FIG. 6d.

Diode bridge 28, 29, 30, 31 rectifies the pulses of FIG. 6a corresponding to the hatched areas of FIG. 5 and feeds them to the ends of resistor 32 to provide voltage $V_{SQ}$, FIG. 6e. The composite control pulse resulting from the sum of the voltages $V_{PS} + V_{SQ} = V_{PQ}$ is shown in FIG. 6f; it coincides with that already shown in FIG. 5.

In addition to windings 6 and 7, power transformer $T_{10}$ also comprises windings 33, 34, 35 and 36. The first two, together with diodes 37 and 38, filter inductance 39 and capacitor 40, provide an auxiliary stabilized voltage for the operation of the regulating and control circuits. Windings 35 and 36 supply the power to the load. As the inverter is of the driven type, the core of $T_{10}$ operates with a flux density sufficiently removed from saturation level and this permits hysteresis losses to be reduced.

Considering now the rectifier and filter unit RF, windings 36 and 35 supply the output loads, in a conventional way, through diodes 43 and 44, inductance 45 and capacitor 46 for the positive output and similarly through diodes 41, 42, inductance 47 and capacitor 48 for the negative output. As previously indicated, these filters are of the mean value type to allow use of the regulating arrangement described herein. In the practical version of the present supply device, the regulator loop is derived from the positive output and the corresponding terminal is indicated in the diagram of FIG. 3 by the reference Z.

As stated above, the chopped square wave generator GOP is a multivibrator similar to that shown by Kadri. This circuit generates two square waves displaced in time and the combination of these two square waves yields a wave of the form shown in FIG. 6c.

The two square waves are generated by two inverters of which one, which will be referred to as the master inverter, can be of the conventional type, with its oscillation frequency determined by the saturation of the transformer. Referring to FIG. 4, this master inverter consists of transformer 49, transistors 50 and 51, diodes 52, 53, 54, resistors 55, 56, 57 and capacitor 58.

The other inverter which will be referred to as the slave inverter consists of transformer 60, transistors 65, 66, diodes 67, 68, 69, 70 resistors 71, 72 and capacitor 60'. It receives its control signal from winding 59 of the first inverter, which determines the operating frequency of both.

A peculiarity of this slave inverter is that the phase of the square wave produced by it across the windings of transformer 60, is delayed by a time $t_o$ (FIG. 6) with respect to the phase of the master, because of the inclusion of a displacement network consisting of the aforementioned winding 59, windings 73 and 74 — which act at the same time as base drivers for transistors 65 and 66 — capacitor 60' and the equivalent resistance across winding 61, the latter forming part of the transformer 62. The foregoing displacement is rendered variable by the different values which this equivalent resistance may assume, in consequence of the load transferred from windings 63, 64, which, as will be seen from FIGS. 3 and 4, are connected to channels A and B respectively, of the described regulator device.

The circuit according to the present invention distinguishes significantly from the Kadri circuit in that in the former the direct connection between the control circuit and displacement network has been replaced by a transformer with three windings. At least for applications of interest in connection with the present invention, this has the following advantages:

a. it provides galvanic isolation between the regulator means and the multivibrators.

b. it permits simultaneous action of two or more regulator channels on the same displacement network, without creating galvanic connections between the regulators themselves.

The variable resistance which is transferred to the displacement network consists of resistor 77 in parallel with the resistance presented by transistor 75 and possibly also transistor 76, in case the latter is called into action due to the presence of an overcurrent or overvoltage.

Transistors 75 and 76, as, incidentally, also the control transistor of the Kadri circuit, function as constant current loads with the magnitude of these loads determined by the value of the base current impressed on them.

It should be emphasized that the value of the displacement $t_o$ depends also on other quantities, such as the capacity C of capacitor 60 shown in FIG. 4, which however remain fixed during the operation of the circuit.

As the supply voltage which conditions the oscillation frequency of the master inverter is one of these quantities, it is clear at this point why care was taken to provide the GOP with a stabilized supply voltage, which, as shown in FIGS. 3 and 4, is taken from the points M and N of the starter device. This supply voltage undergoes further filtering by way of inductor 78 and capacitor 79, at the power input to the GOP (FIG. 4).

The error detector and amplifier RE (channel A) will now be described in detail.

A part of the output voltage, which is derived by means of voltage divider 80, 81, 82, is compared with the reference voltage across the zener diode 83. This latter is fed from resistor 89.

The difference between these two voltages, which is impressed on the differential amplifier consisting of transistors 84 and 85 and resistors 86, 87, 88 is amplified and eventually used to control transistor 75.

The collector current of this transistor is the greater the greater the input voltage to the differential amplifier is with respect to that of the zener diode.

A larger current traversing transistor 75 means a smaller resistance transferred to the GOP and hence a smaller value of the time constant acting in the displacement network of the GOP. The consequence of this is a smaller displacement $t_o$ and hence a smaller width of the control pulses passed to the power inverter. As the mean value of the rectified output voltage is proportional to this width, it follows that the output voltage drops. The negative feedback necessary for the operation of the regulator loop is provided in this manner.

Turning now to the description of the overcurrent and overvoltage protection device (channel B) the supply current to the power inverter is measured by the sensor 3, FIG. 3, and is passed in the form of a voltage proportional to this current to the input of channel B between points C and D. This voltage is rectified and doubled by means of diodes 90 and 91 and capacitors 92 and 93 and then amplified by transistor 94.

The amplified voltage across the output terminals of resistor 95 is then compared with the voltage of zener diode 96 and fed to the input of the transistor 76.

This latter acts in a manner similar to transistor 75 of channel A. An increase in current beyond the threshold value fixed by zener 96, causes transistor 76 to conduct and hence leads to a reduction of the pulse width. The negative feedback so provided is such as to maintain the peak valve of the current pulses traversing transistors 1 and 2 constant, thereby protecting them against possible overloads and short circuits. This action is added to that of diode 97 and resistor 98 in the following manner:

In the presence of strong overloads or short circuits the voltage at point T falls below the threshold limit fixed by zener 96 and by the drop in voltage across resistor 99, because of which diode 97 starts to conduct.

In consequence the base current of transistor 76 undergoes a marked increase, which rapidly causes the power transistors to operate with a very reduced phase angle.

The operation of zener diode 101 and resistor 100 is different. In the case of an output overvoltage, which is automatically reflected as an overvoltage at point M, the zener diode 101 conducts and produces a voltage across resistor 100 such as to make transistors 94 and 76 conduct strongly. The operation at this point is similar to that of overload protection and the output voltage remains fixed at the safety level determined by zener 101.

The object of this overvoltage protection is to intervene when the output voltage, because of the effect of a fault in some component of channel A, rises to levels which are dangerous for the equipment to be supplied.

The starter device consists of resistor 102, zener diode 103, transistor 104 and diodes 105 and 106.

Transistor 104 operates as an emitter-follower stabilizer and produces a stabilized voltage between points D' and N which is slightly less than that present between T and N under normal operating conditions.

Initially the power necessary for starting the supply device comes from the foregoing stabilizer and directly supplies channel B from point D', while the GOP receives power from point M by way of diode 105. When the output voltages have reached their normal value point T is at a voltage which, as stated, is greater than that of point D', because of which diode 105 becomes non-conductive and diode 106 begins to operate instead. In this case the current required by the GOP is provided by the power inverter and the power loss due to dissipation in transistor 104 is eliminated. A small current, however, remains in transistor 104, this current being due to the powering of channel B.

What is claimed is

1. A self-regulated DC to DC converter of the type in which the width of the pulses produced by a square wave generator including two inverters is governed by an impedance on the control side of the generator, the magnitude of which is varied under the control of the converter output, said impedance forming part of an RC-type phase displacement network interposed between said inverters; said converter comprising:

a transformer having a primary winding connected to said control side of the generator and having at least two secondary windings each having the output path of a transistor connected thereacross by way of a diode bridge;

error detecting apparatus for impressing a first DC control voltage on the input path of one of said transistors, said first voltage varying as a continuous function of the converter output voltage;

and protecting apparatus for impressing a second DC control voltage on the input path of the other transistor, said second voltage depending on said converter being subjected to excessive electrical conditions;

whereby the width of the pulses produced by said generator is governed by impedance variations in said primary winding which are due to variations of both said first and second DC voltages and, hence, of the currents flowing in said transistor output paths, and whereby physical isolation is insured between both said apparatus and said square wave generator and hence between the output and the input of said converter.

2. A self-regulated DC to DC converter as claimed in claim 1, which comprises a transistor-type power inverter controlled by the output of said square wave generator and having an output transformer with a non-saturable magnetic core.

3. A self-regulated DC to DC converter as claimed in claim 2, wherein there are provided means for deriving from said power inverter by inductive coupling a voltage proportional to the power inverter current, and wherein said protecting apparatus comprises overload protecting means for deriving said second DC control voltage from said proportional voltage.

4. A self-regulated DC to DC converter as claimed in claim 3, wherein said overload protecting means includes circuit elements for doubler rectifying said proportional voltage and comparing the rectified product with a reference voltage.

5. A self-regulated DC to DC converter as claimed in claim 2, wherein the output transformer of said power inverter has first and second physically isolated secondary windings from which two DC sources, regulated by said converter, are derived for supplying the converter output and powering the square wave generator, respectively.

6. A self-regulated DC to DC converter as claimed in claim 5, wherein said protecting apparatus further comprises means including a diode for comparing the voltage of the last-mentioned regulated DC source with a reference voltage, said diode being poled so as to become conductive when the voltage of said DC source, as a result of an overload, drops below a predetermined level, thereby causing a marked increase in said second DC control voltage.

7. A self-regulated DC to DC converter as claimed in claim 5, wherein said protecting apparatus comprises over-voltage protecting means including a zener diode, said zener diode being connected to one side of the square wave generator power supply and becoming conductive to bring about a marked increase of said second DC control voltage when the square wave generator supply voltage exceeds a predetermined level.

8. A self-regulated DC to DC converter as claimed in claim 5, which comprises a starting circuit including preregulating means and two rectifier elements, the first of said elements being connected between one side of said square wave generator power supply and said preregulating means and the second of said elements being connected between said one side of said square wave generator power supply and said last-mentioned regulated DC source, said two rectifier elements being poled so that initially said first element is conductive and said second element non-conductive whereby said square wave generator is initially powered by said preregulating means, and that when the voltage of said regulated DC source reaches its nominal value said first element becomes non-conductive and said second element conductive whereby the powering of said square wave generator is taken over by said regulated DC source.

9. A self-regulated DC to DC converter comprising:
a square wave generator of the type which includes two inverters each having a transformer and in which the phase between the pulses produced by said two inverters is varied under the control of the converter output voltage;
a power inverter having two push-pull connected switching transistors, the combined pulses produced by the first-mentioned two inverters being impressed between the individual control electrodes of said two switching transistors and a common return circuit;
a resistor serially interposed in said return circuit;
interconnected auxiliary windings on said two transformers respectively; and
a rectifier bridge having its input connected to said auxiliary windings and its output connected across said resistor;
whereby quenching pulses minimizing the switching losses in said switching transistors are added to the aforementioned combined pulses.

* * * * *